US012566684B2

(12) United States Patent
Sounderrajan

(10) Patent No.: US 12,566,684 B2
(45) Date of Patent: Mar. 3, 2026

(54) AVOIDING FAILED TRANSACTIONS WITH ARTIFICIAL-INTELLIGENCE BASED MONITORING

(71) Applicant: Truist Bank, Charlotte, NC (US)

(72) Inventor: Sunitha Sounderrajan, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 130 days.

(21) Appl. No.: 18/354,894

(22) Filed: Jul. 19, 2023

(65) Prior Publication Data

US 2025/0028613 A1     Jan. 23, 2025

(51) Int. Cl.
*G06N 20/00*     (2019.01)
*G06F 11/22*     (2006.01)

(52) U.S. Cl.
CPC ......... *G06F 11/2257* (2013.01); *G06N 20/00* (2019.01)

(58) Field of Classification Search
CPC .. G06F 11/2257; G06F 11/2263; G06N 20/00
See application file for complete search history.

(56) References Cited

U.S. PATENT DOCUMENTS

| | | | |
|---|---|---|---|
| 11,599,890 B1* | 3/2023 | Kalaboukis | H04L 63/1408 |
| 2015/0019912 A1* | 1/2015 | Darling | G06F 11/3684 714/26 |

| | | | |
|---|---|---|---|
| 2017/0053357 A1* | 2/2017 | Bowman | G06F 16/2471 |
| 2019/0317850 A1* | 10/2019 | Chau | G06F 8/61 |
| 2020/0341834 A1* | 10/2020 | Safary | G06F 11/2257 |
| 2021/0303381 A1* | 9/2021 | Baldassarre | G06N 5/04 |
| 2021/0374567 A1* | 12/2021 | Bhimireddy | G06F 11/0793 |
| 2023/0186308 A1* | 6/2023 | Babu | G06Q 20/108 705/44 |

OTHER PUBLICATIONS

Stripe, "Recurring Payments: What Businesses Need to Know", Jun. 14, 2023. Retrieved from the Internet. <URL: stripe.com/resources/more/recurring-payments> (Year: 2023).*

* cited by examiner

*Primary Examiner* — Michael Maskulinski
*Assistant Examiner* — Bryan P Huang
(74) *Attorney, Agent, or Firm* — Kilpatrick Townsend & Stockton LLP; Michael A. Springs, Esq.

(57)     ABSTRACT

A system can receive training data that includes relationships between characteristics of failed requests and computing services at which the failed requests failed. The system can then train a machine-learning model using the training data to learn relationships between the characteristics of the failed requests and the computing services at which the failed requests failed. Thereafter, the system can receive a request and provide a characteristic of the pending request as input to the trained machine-learning model, which can generate a failure prediction based on the characteristic of the pending request. In response to the failure prediction indicating that the pending request is likely to fail, the system can determine an intervention for the pending request based on the computing service at which the pending request is predicted to fail and execute the intervention.

21 Claims, 4 Drawing Sheets

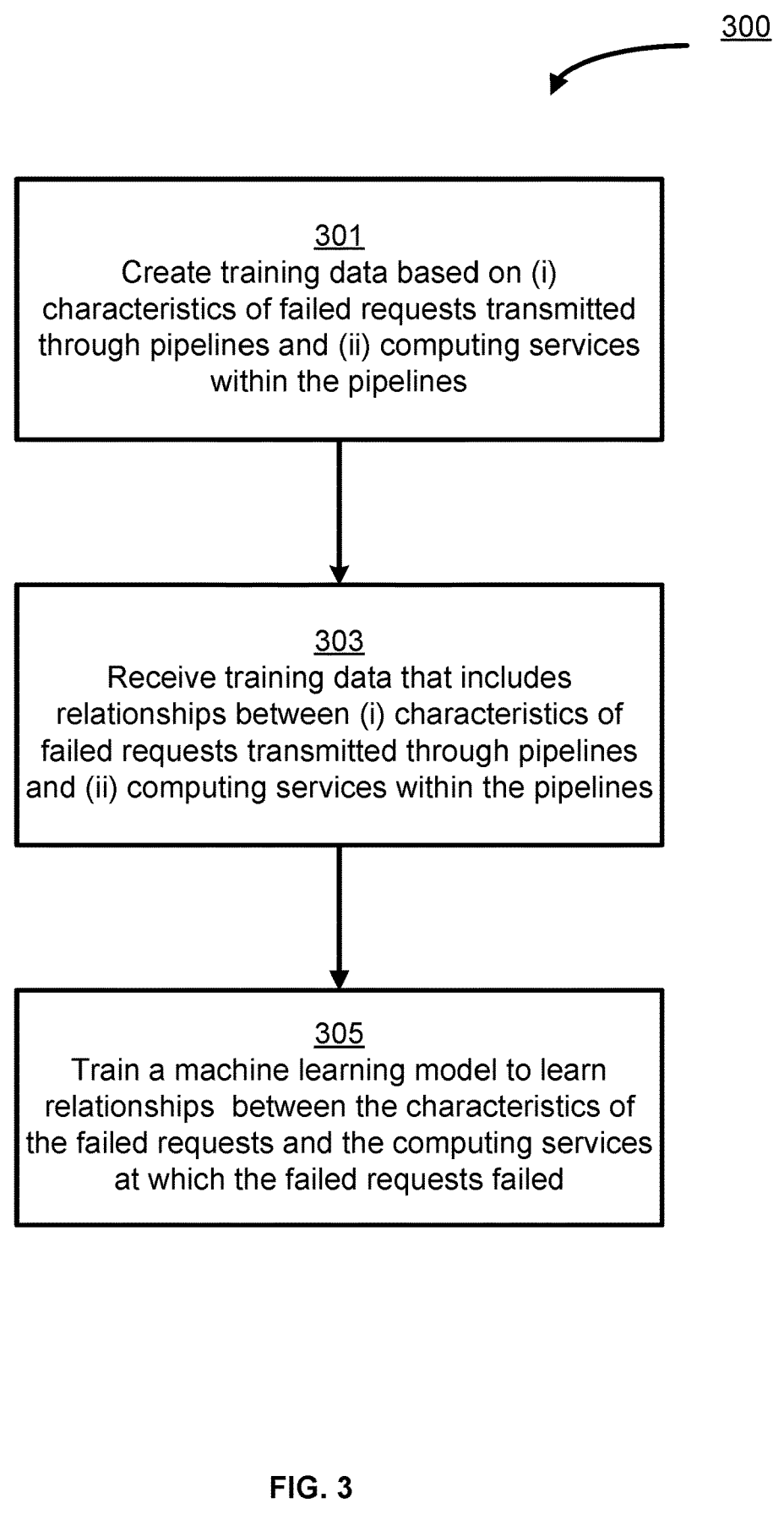

300

301
Create training data based on (i) characteristics of failed requests transmitted through pipelines and (ii) computing services within the pipelines

303
Receive training data that includes relationships between (i) characteristics of failed requests transmitted through pipelines and (ii) computing services within the pipelines

305
Train a machine learning model to learn relationships between the characteristics of the failed requests and the computing services at which the failed requests failed

FIG. 3

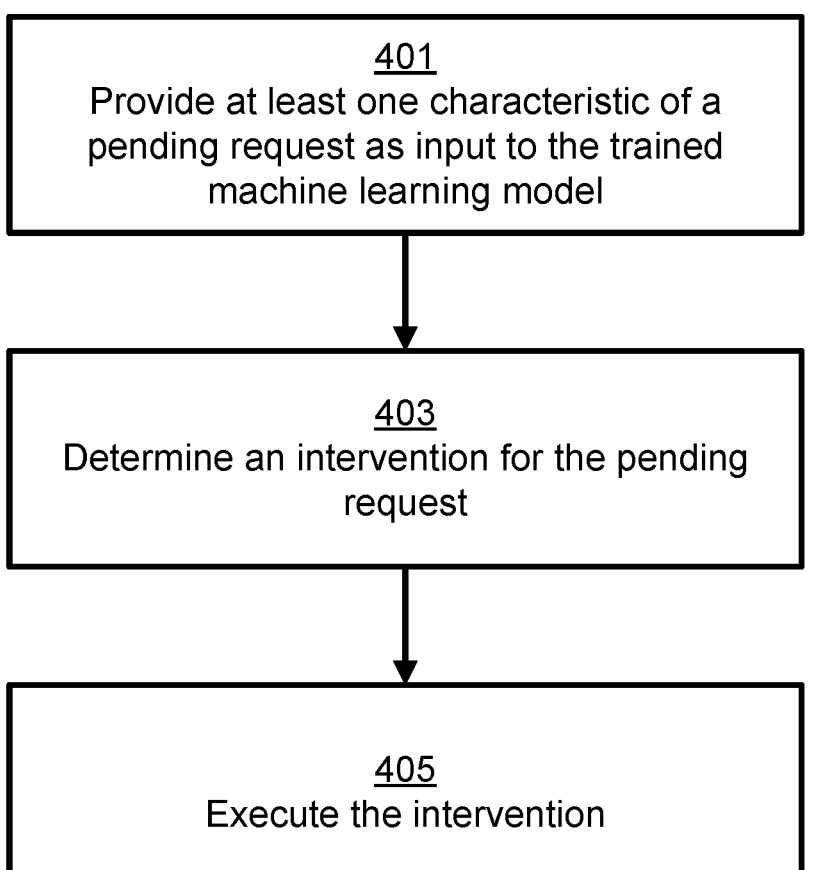
FIG. 4

AVOIDING FAILED TRANSACTIONS WITH ARTIFICIAL-INTELLIGENCE BASED MONITORING

TECHNICAL FIELD

The present disclosure relates generally to monitoring transactions and, more particularly (although not necessarily exclusively), to using artificial intelligence to avoid transaction failures.

BACKGROUND

Computers may process large amounts of transactions. Transaction processing may involve executing individual computing services that either fail or succeed. Each transaction may be processed through a pipeline of such computing services. The various computing services of the pipeline may work in a specific sequence to execute particular transactions.

SUMMARY

Presented is a method involving receiving, by at least one processor, training data that includes relationships between (i) characteristics of failed request transmitted through pipelines and (ii) computing services within the pipelines at which the failed requests failed, wherein the pipelines include respective sequences of computing services configured to handle a plurality of different requests. The method may further include training, by the at least one processor, a machine-learning model using the training data to learn relationships between the characteristics of the failed requests and the computing services at which the failed requests failed, thereby generating a trained machine-learning model. The method may further include providing, by the at least one processor, at least one characteristic of a pending request as input to the trained machine-learning model, the trained machine-learning model being configured to generate a failure prediction based on the at least one characteristic of the pending request, the failure prediction indicating that the pending request may be likely to fail and a computing service of a pipeline at which the pending request may be predicted to fail. In response to the failure prediction indicating that the pending request may be likely to fail, the method may further include determining, by the at least one processor, an intervention for the pending request based on the computing service at which the pending request may be predicted to fail and executing the intervention.

Also presented is a system including a processor an a non-transitory, computer-readable medium comprising instructions that are executable by the processor. The system instructions are executable by the processor for causing the processor to receive training data that includes relationships between (i) characteristics of failed requests transmitted through pipelines and (ii) computing services within the pipelines at which the failed requests failed, wherein the pipelines include respective sequences of computing services configured to handle a plurality of different requests. The system may further include instructions that are executable by the processor for causing the processor to train a machine-learning model using the training data to learn relationships between the characteristics of the failed requests and the computing services at which the failed requests failed, thereby generating a trained machine-learning model. The system may further include instructions that are executable by the processor for causing the processor to provide at least one characteristic of a pending request as input to the trained machine-learning model, the trained machine-learning model being configured to generate a failure prediction based on the at least one characteristic of the pending request, the failure prediction indicating that the pending request may be likely to fail and an computing service of a pipeline at which the pending request may be predicted to fail. The system may further include instructions that are executable by the processor for causing the processor to, in response to the failure prediction indicating that the pending request may be likely to fail, determine an intervention for the pending request based on the computing service at which the pending request may be predicted to fail, and execute the intervention.

Also presented is a non-transitory computer-readable medium comprising instructions that are executable by a processing device for causing the processing device to receive training data that includes relationships between (i) characteristics of failed requests transmitted through pipelines and (ii) computing services within the pipelines at which the failed requests failed, wherein the pipelines include respective sequences of computing services configured to handle a plurality of different requests. The non-transitory computer-readable medium may further include instructions to train a machine-learning model using the training data to learn relationships between the characteristics of the failed requests and the computing services at which the failed requests failed, thereby generating a trained machine-learning model. The non-transitory computer-readable medium may further include instructions to provide at least one characteristic of a pending request as input to the trained machine-learning model, the trained machine-learning model being configured to generate a failure prediction based on the at least one characteristic of the pending request, the failure prediction indicating that the pending request may be likely to fail and an computing service of a pipeline at which the pending request may be predicted to fail. The non-transitory computer-readable medium may further include instructions to in response to the failure prediction indicating that the pending request may be likely to fail, determine an intervention for the pending request based on the computing service at which the pending request may be predicted to fail, and execute the intervention.

BRIEF DESCRIPTION OF THE DRAWINGS

FIG. 3 is a flowchart of an example of a process for training a machine-learning model according to some aspects of the present disclosure.

FIG. 4 is a flowchart of an example of a process for determining an intervention for a pending request according to some aspects of the present disclosure.

DETAILED DESCRIPTION

Figure 1:
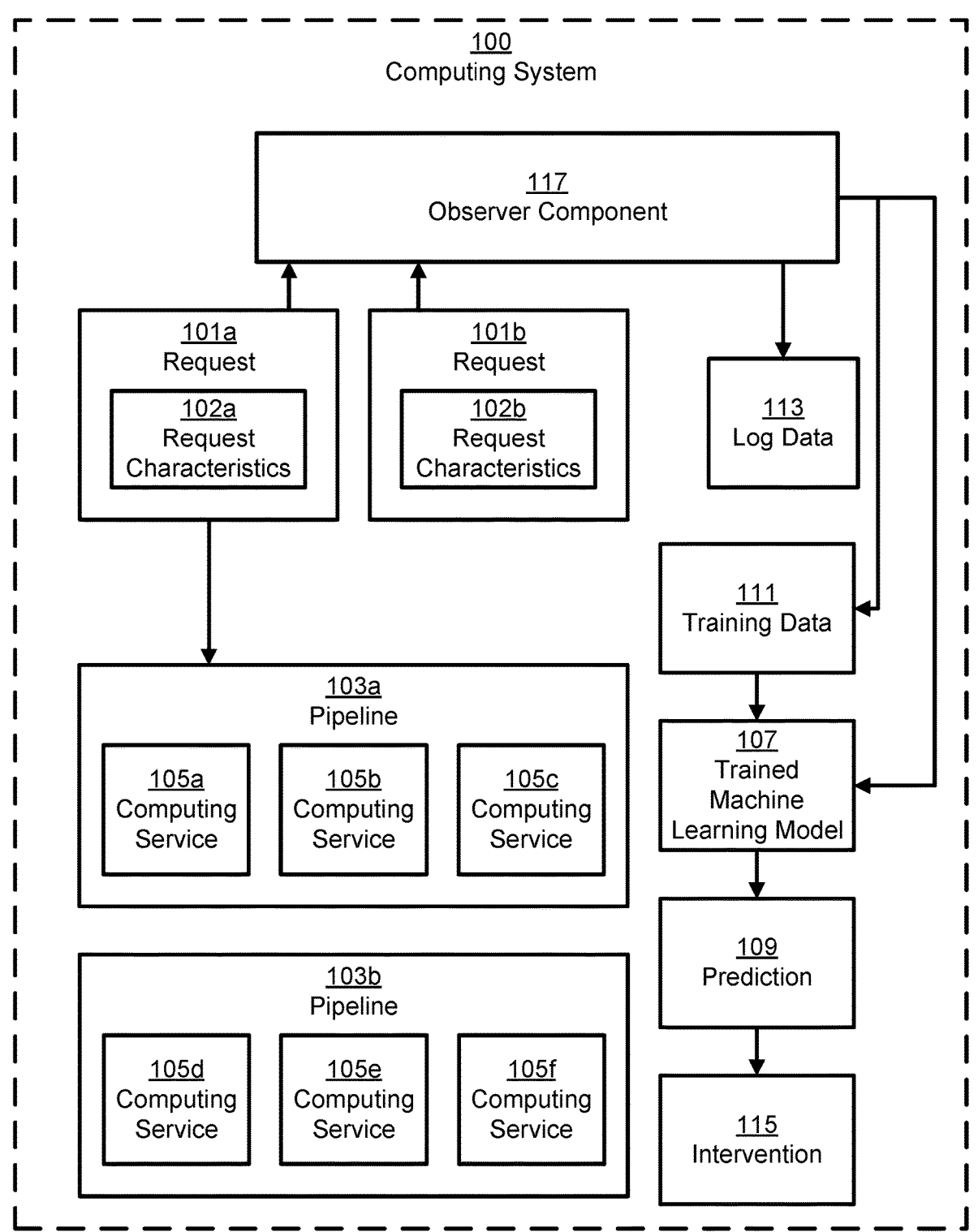
FIG. 1 is a block diagram of an example of a computing system for processing transaction requests according to some aspects of the present disclosure.

Certain aspects and examples of the present disclosure relate to predicting the failure of transactions by monitoring the transactions with a trained machine-learning model. Transactions may be related to any possible recorded exchange of value (e.g., fiat or currency) between two entities, including cash transactions, non-cash transactions, credit transactions, etc. The machine-learning model may be trained to preemptively predict whether a transaction is going to fail prior to the transaction actually being sent through a processing pipeline designed to handle the transaction. The machine-learning model may be trained with data from previous transaction failures so that the machine-learning model can learn relationships between transaction characteristics and the resulting failures. If the machine-learning model determines that a transaction is likely to fail, the system can automatically determine and execute an intervention to prevent a transaction failure. In this way, transaction failures may be preemptively predicted, before the transactions undergo their normal processing pipelines, so that such failures can be avoided.

Using a machine-learning model to recognize potential transaction failures before they occur may have the advantage of reducing transaction failures. Because each transaction consumes computing resources (e.g., processing power, memory, storage, and bandwidth) to process, and failed transactions often need to be modified and re-processed multiple times until they are successful or discarded, there can be a significant amount of computing services wasted due to failed transactions. These issues are compounded at high volumes, where there may be hundreds of thousands or millions of daily transactions that require vast amount of computing services to process. If even a small percentage of those transactions fail, the net cumulative effect can be significant processing inefficiencies. Preventing such failed transactions can therefore improve resource consumption, which in turn also reduces energy consumption and overhead costs.

Additionally, it can be challenging to determine why a transaction failed. A transaction may fail for any number of reasons, including the specific sequence in which software services were executed to handle the transaction. As a result, triaging the cause of a transaction's failure after the fact can be difficult and time consuming. But some examples described herein can use a machine-learning model to not only predict if a transaction is going to fail, but also predict a reason why that transaction is going to fail. This preemptive approach can expedite failure detection and resolution. Such a preemptive approach may also be more dependable than conventional manual investigation, which only tends to occur after a failure has already happened (and thus computing resources have already been wasted) and involves deriving a cause of failure based on data intrinsic to the failed transaction alone.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing system 100 for processing transaction requests according to some aspects of the present disclosure. The computing system 100 can include multiple pipelines 103*a*, 103*b* for handling different types of requests. Each of the pipelines 103*a*, 103*b* can include a sequence of computing services 105*a-f* that is predesignated for handling requests of a certain type. The computing services 105*a-f* can be software services (e.g., microservices or serverless functions) that are configured to perform respective software tasks to implement their respective subparts of an overall processing pipeline. Each of the computing services 105*a-f* in a pipeline may provide a distinct service needed to handle a request, such as a payment service, authorization service, or encryption service. The computing services 105*a-f* can be distributed across multiple networked nodes (e.g., physical or virtual machines) of the computing system 100, which may for example be a cloud computing system, a computing cluster, or a data grid. Each of the pipelines 103*a*, 103*b* can be predefined and have a predesignated starting service and ending service.

Each pipeline 103*a*, 103*b* can have a unique set or sequence of computing services for handling a corresponding type of request. The computing system 100 can determine which pipeline is to handle a request 101*a* based on the characteristics of the request. After an appropriate pipeline is selected for a request, the request 101*a* can be processed through the pipeline, for example by executing the sequence of computing services 105*a-c* in pipeline 103*a*.

As the various pipelines in the computing system 100 process transactions, an observer component 117 can observe the results (and log data 113) and generate training data 111 for use in training a machine-learning model 107. Examples of the machine-learning model 107 can include a neural network, a support vector machine, a classifier, or an ensemble of models. The observer component 117 can generate the training data 111 based on previous successful transactions and previous failed transactions, some of which may be determined from the log data 113. For instance, the observer component 117 can generate the training data 111 based on failed transactions across some or all pipelines over the last 365 days. The training data 111 can include relationships between transaction characteristics and downstream failures during pipeline processing. The training data 111 can also include information about which computing services in which pipelines led to the failures. This may allow the trained machine-learning model 107 to learn which types of transactions are likely to fail and why. For example, the machine-learning model 107 can learn whether transactions with certain characteristics tend to succeed or fail, and if they tend to fail, which computing services are normally the root cause. This can help the trained machine-learning model 107 make informed predictions about future transactions with similar characteristics.

After the machine-learning model 107 has been trained, the computing system 100 may receive a request 101 for a transaction (e.g., a financial transaction). The request 101 can have certain characteristics 102, such as a type, source account, destination account, amount, date/time of the request, one or more flags, etc. The observer component 117 can provide some or all of the characteristics 102 of the request 101 as input to the trained machine-learning model 107, which can provide an output prediction 109 indicating whether the request 101 is likely to fail and, if so, why. The observer component 117 can also provide this input to the machine-learning model 107 prior to providing the request 101 to a corresponding pipeline 103*a*, so that request 101 is evaluated prior to execution of the pipeline 103*a*. For example, computing service 105*a* may be configured to access a certain database and retrieve account information. Based on the training data 111, the trained machine-learning model 107 may recognize that, if the request 101 includes certain characters in an account number, the database connection and thus the request 101 is likely to fail. The trained machine-learning model 107 may then provide the prediction 109 of the impending failed transaction, including the reason for the impending failure.

The computing system 100 can receive the output prediction 109 from the trained machine-learning model 107 and determine an intervention 115 that may be likely to be effective in preventing the failure. For example, the computing system 100 can use a lookup table to determine the intervention 115. The lookup table can correlate failure reasons to interventions. The computing system 100 can use the lookup table to determine an intervention 115 that is likely to be effective based on the predicted reason for the failure. Alternatively, the trained machine-learning model 107 may be trained to determine the intervention 115 based on the predicted reason for the failure. In one such example, the trained machine-learning model may include an ensemble of machine-learning models. The ensemble may include a first machine-learning model is trained to predict whether and why a request is going to fail based on the request's characteristics, and a second machine-learning model is trained to predict an intervention to prevent the failure. The second machine-learning model may be trained using labeled training data that correlates failures to interventions.

There are many types of interventions that that computing system 100 can potentially implement to fix a potential problem related to a request. One example of such an intervention may involve modifying the content of the request itself, such as modifying an account number or flag. Other interventions may involve queuing the request, returning the request to its originator for modification, running a repair script to fix a bug in the configuration of a computing service, alerting a user, etc. Some interventions may involve combinations of the above. And in some examples, the computing system 100 can determine a plurality of ranked recommendations for the intervention 115 and provide them to a user, who can select which of the recommended interventions to implement.

After determining an intervention 115 to execute in relation to the request 101, the computing system 100 can then execute the selected intervention. In this way, the computing system 100 can preemptively detect and resolve a problem related to the request 101, before the request 101 is ever processed by the pipeline 103*a*. This may avoid sending the request 101 through the pipeline 103*a*, only to have the request 101 fail and have to be revised and re-sent through the pipeline 103*a* again at a later time. After the intervention 115 is complete, the request 101 may then be sent through the pipeline 103*a* for processing.

Figure 2:
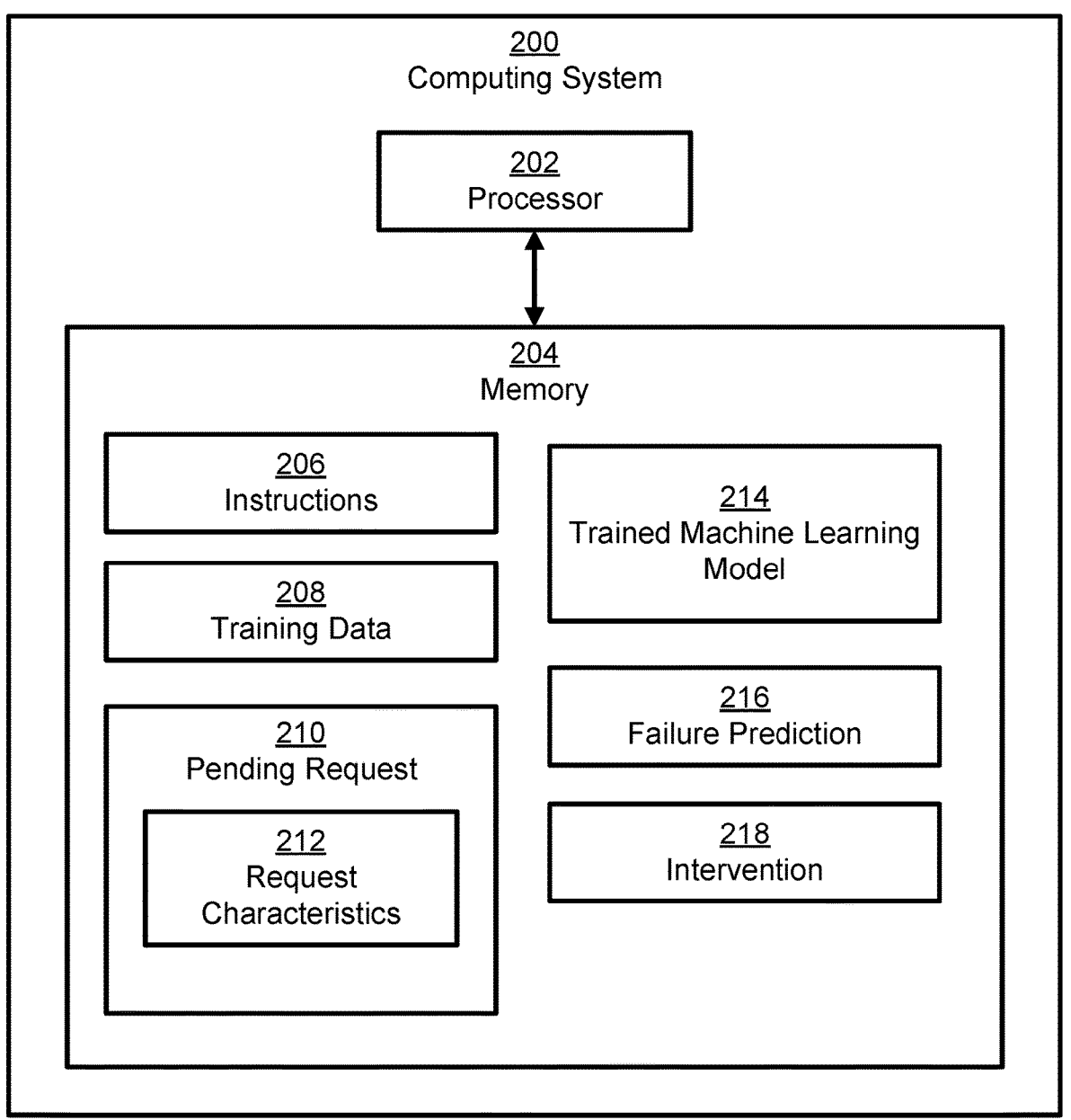
FIG. 2 is a block diagram of an example of a computing system according to some aspects of the present disclosure.

FIG. 2 is a block diagram of an example of a computing system 200 according to some aspects of the present disclosure. The computing system 200 includes a processor 202 that is communicatively coupled to a memory 204. In some examples, the processor and the memory 204 may be distributed from (e.g., remote to) one another.

The processor 202 can include one processing device or multiple processing devices. Non-limiting examples of the processor 202 include a Field-Programmable Gate Array (FPGA), an application-specific integrated circuit (ASIC), or a microprocessor. The processor 202 can execute instructions 206 stored in the memory 204 to perform operations. In some examples, the instructions 206 can include processor-specific instructions generated by a compiler or an interpreter from code written in a suitable computer-programming language, such as C, C++, C#, Java, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium from which the processor 202 can read instructions 206. A computer-readable medium can include electronic, optical, magnetic, or other storage devices capable of providing the processor 202 with computer-readable instructions or program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The memory 204 may further include at least one set of training data 208. The training data 208 can include relationships between characteristics of failed requests transmitted through a transaction pipeline and computing services within the pipelines at which the failed request failed. These pipelines can include respective sequences of computing services configured to handle a plurality of different transaction requests. The training data 208 can further include relationships between request characteristics 212, failed requests, and the success rates of various interventions in resolving failed requests.

The memory 204 can further include a trained machine-learning model 214. The trained machine-learning model 214 may have been trained on the training data 208. The trained machine-learning model 214 may analyze request characteristics 212 of a pending request 210. Examples of the request characteristics 212 may include a transaction type, a destination account, a source account, an amount, or a validation status associated with the pending request 210. The trained machine-learning model 214 may generate a failure prediction 216 based on the request characteristics 212. In response to the failure prediction 216 indicating that the pending request 210 is likely to fail, the computing system 200 may determine an intervention 218 for the pending request 210 and execute the intervention 218.

FIG. 3 is a flowchart of an example of a process 300 for training a machine-learning model according to some aspects of the present disclosure. The example process will be described with respect to the computing system 200 shown in FIG. 2; however, any suitable system according to this disclosure may be employed, such as the block diagram of FIG. 1.

At block 301, training data is created based on (i) characteristics of failed requests transmitted through pipelines and (ii) computing services within the pipeline where the requests failed. The characteristics of failed requests and computing services within the pipeline where the request failed may be collected by an observer component 117 of a computing system 100.

The training data may be created either manually or automatically. In examples where the training data is created automatically, the training data may be created by the computing system 200 or a second computing system. In some such examples, the computing system 200 or a second computing system may map characteristics of failed requests (e.g. a request of a certain value, a request made internationally) to computing services (e.g. a service used to transfer value) used before or during the failure of the request. In some examples where the training data is created manually, known relationships between characteristics of the failed requests and computing services may be labeled so that a function may be inferred from the labeled training data.

At block 303, the computing system 200 may receive training data 208 that includes relationships between (i) the characteristics of failed requests transmitted through pipelines and (ii) the computing services within the pipelines at which the requests failed. The pipelines may be similar to the pipelines 103a, 103b of FIG. 1, wherein the computing services are similar to the computing services 105a-f of FIG. 1.

The computing system 200 can include any number of pipelines. In some examples, the pipelines may include a first pipeline for executing a recurring request and a second pipeline for executing a one-time request. The pipelines may include distinct pipelines for specific internal exchanges, such as transferring funds between accounts of a single customer. The pipelines may include distinct pipelines for specific external exchanges, such as a distinct pipeline for a mortgage payment and a distinct pipeline for a utility payment.

The computing services within a pipeline may be responsible for distinct steps for handling a transaction, such as determining a destination, determining a transaction schedule, authorizing a transaction, or confirming a transaction.

At block 305, the computing system 200 may train a machine-learning model 214 to learn relationships between the characteristics of the failed request and the computing services at which the failed request fails. Training the machine-learning model 214 may involve thousands or millions of training iterations to transform the model from an untrained state to a trained state.

In some examples, the machine-learning model 214 may learn to identify potential failures based on other factors, such as user input errors, packet loss, connection faults, unwanted traffic, outdated devices, or software compatibility issues. The computing system 200 may also train the machine-learning model 214 to learn relationships between the characteristics of the failed requests, the computing services at which the failed requests fail, and interventions which succeeded or are likely to succeed.

FIG. 4 is a flowchart of a process 400 for executing an intervention 218 according to some aspects of the present disclosure. The example process will be described with respect to the computing system 200 shown in FIG. 2; however, any suitable system according to this disclosure may be employed, such as the block diagram of FIG. 1.

At block 401, the computing system 200 provides at least one characteristic 212 of a pending request 210 as an input to the trained machine-learning model 214. The characteristics 212 of the pending request 210 may include a transaction type, a destination account, a source account, an amount, or a payment validation status associated with the pending request 210.

At block 403, the computing system 200 determines an intervention 218 for the pending request 210. For example, the trained machine-learning model 214 may determine and output a single intervention based on the at least one characteristic 212 of the pending request 210. As another example, the trained machine-learning model may determine and output a set of ranked interventions based on the at least one characteristic 212 of the pending request 210. The trained machine-learning model may rank recommendations based on the training data 208 with which the machine-learning model 214 was trained. An alert may then be transmitted to a user about the failure prediction 216, wherein the alert includes the plurality of ranked recommendations for the intervention 218. The user can then select one of the ranked recommendations, which the computing system 200 can designate as the intervention 218 to be executed. In this way, the computing system 200 can determine the intervention 218 for the pending request 210.

At block 405, the computing system 200 executes the intervention 218. In some examples, the intervention 218 may include queuing the pending request 210. Additionally or alternatively, the intervention 218 may include issuing a prompt for a user response to approve the pending request 210. Additionally or alternatively, the intervention 218 may include running a repair script designed to avoid a failure of the pending request 210. Additionally or alternatively, the intervention 218 may involve connecting the user with a connection to a service agent.

As one particular example, a request is made to receive a credit card transaction. The request is submitted through a pipeline and the pipeline includes a computing service for verifying the cardholder has sufficient available credit. A machine-learning model observes this and other computing services within the pipeline.

In this particular example, the machine-learning model is trained with characteristics of failed credit card related transactions and computing services used during the failed credit card related transactions. The machine-learning model may also be trained with relationships between characteristics of the failed transactions and successful interventions used to correct the failed transactions.

In this particular example, the machine-learning model observes that the computing service for verifying the cardholder has sufficient available credit is hosted on an outdated system. The machine-learning model may determine running a repair script to proofread inputs provided by the outdated system has a high chance of avoiding a potential failure for the request. As a result, the repair script is executed to preemptively save the request from potential failure.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:

receiving, by at least one processor, training data that includes mappings between (i) characteristics of failed requests transmitted through pipelines and (ii) computing services within the pipelines at which the failed requests failed, wherein the pipelines include respective sequences of computing services configured to handle a plurality of different types of requests, wherein each of the mappings correlates (i) a respective set of characteristics for a respective failed request transmitted through a respective pipeline to (ii) a respective computing service within the respective pipeline at which the respective failed request failed;

training, by the at least one processor, a machine-learning model using the training data to learn relationships between the characteristics of the failed requests and the computing services at which the failed requests failed, thereby generating a trained machine-learning model;

receiving, by the at least one processor, a pending request from a computing device;

determining, by the at least one processor, a pipeline for the pending request; and prior to transmitting the pending request through the determined pipeline:

providing, by the at least one processor, at least one characteristic of the pending request as input to the trained machine-learning model;

executing the trained machine-learning model based on the input to generate an output indicating that the pending request is likely to fail and a computing service of the pipeline at which the pending request is predicted to fail; and in response to the output from the machine-learning model indicating that the pending request is likely to fail, executing an intervention configured to prevent failure of the pending request at the computing service, wherein the intervention involves an interaction with a computing system that includes the pipeline.

2. The method of claim 1, wherein the pipelines include a first pipeline for executing a recurring request and a second pipeline for executing a one-time request.

3. The method of claim 1, wherein the at least one characteristic of the pending request includes a transaction type, a destination account, a source account, an amount, and a validation status associated with the pending request.

4. The method of claim 1, wherein the intervention includes queuing the pending request.

5. The method of claim 1, wherein the intervention includes issuing a prompt for a user response to approve the pending request.

6. The method of claim 1, wherein the intervention includes running a repair script configured to avoid a failure of the pending request.

7. The method of claim 1, wherein the intervention involves returning the pending request to its initiator for modification.

8. The method of claim 1, further comprising:

determining a plurality of ranked recommendations for the intervention;

transmitting an alert to a user based on the output from the trained machine-learning model indicating that the pending request is likely to fail, wherein the alert includes the plurality of ranked recommendations for the intervention;

receiving a user selection of a recommended intervention from among the plurality of ranked recommendations; and designating the recommended intervention selected by the user as the intervention to be executed.

9. The method of claim 8, wherein the trained machine-learning model is a first machine-learning model, and further comprising:

determining the plurality of ranked recommendations for the intervention by executing a second machine-learning model, the second machine-learning model being configured to output the plurality of ranked recommendations.

10. A system comprising:

a processor; and a non-transitory, computer-readable medium comprising instructions that are executable by the processor for causing the processor to:

receive training data that includes mappings between (i) characteristics of failed requests transmitted through pipelines and (ii) computing services within the pipelines at which the failed requests failed, wherein the pipelines include respective sequences of computing services configured to handle a plurality of different types of requests, wherein each of the mappings correlates (i) a respective set of characteristics for a failed respective request transmitted through a respective pipeline to (ii) a respective computing service within the respective pipeline at which the respective failed request failed;

train a machine-learning model using the training data to learn relationships between the characteristics of the failed requests and the computing services at which the failed requests failed, thereby generating a trained machine-learning model;

receive a pending request from a computing device;

determine a pipeline for the pending request; and prior to transmitting the pending request through the determined pipeline:

provide at least one characteristic of the pending request as input to the trained machine-learning model;

execute the trained machine-learning model to generate an output indicating that the pending request is likely to fail and a computing service of the pipeline at which the pending request is predicted to fail; and in response to the output from the machine-learning model indicating that the pending request is likely to fail, execute an intervention configured to prevent failure of the pending request at the computing service, wherein the intervention involves an interaction with a computing system that includes the pipeline.

11. The system of claim 10, wherein the pipelines include a first pipeline to execute a recurring request and a second pipeline to execute a one-time request.

12. The system of claim 10, wherein the at least one characteristic of the pending request includes a transaction type, a destination account, a source account, an amount, and a validation status associated with the pending request.

13. The system of claim 10, wherein the intervention involves queuing the pending request.

14. The system of claim 10, wherein the intervention involves prompting a user to approve the pending request.

15. The system of claim 10, wherein the intervention involves running a repair script configured to avoid a failure of the pending request.

16. A non-transitory computer-readable medium comprising instructions that are executable by a processing device for causing the processing device to:

receive training data that includes mappings between (i) characteristics of failed requests transmitted through pipelines and (ii) computing services within the pipelines at which the failed requests failed, wherein the pipelines include respective sequences of computing services configured to handle a plurality of different types of requests, wherein each of the mappings correlates (i) a respective set of characteristics for a failed respective request transmitted through a respective pipeline to (ii) a respective computing service within the respective pipeline at which the respective failed request failed;

train a machine-learning model using the training data to learn relationships between the characteristics of the failed requests and the computing services at which the failed requests failed, thereby generating a trained machine-learning model;

receive a pending request from a computing device;

determine a pipeline for the pending request; and prior to transmitting the pending request through the determined pipeline:

provide at least one characteristic of the pending request as input to the trained machine-learning model;

execute the trained machine-learning model to generate an output indicating that the pending request is likely to fail and a computing service of the pipeline at which the pending request is predicted to fail; and in response to the output from the machine-learning model indicating that the pending request is likely to fail, execute an intervention configured to prevent failure of the pending request at the computing service, wherein the intervention involves an interaction with a computing system that includes the pipeline.

17. The non-transitory computer-readable medium of claim 16, wherein the pipelines include a first pipeline to execute a recurring request and a second pipeline to execute a one-time request.

18. The non-transitory computer-readable medium of claim 16, wherein the at least one characteristic of the pending request includes a transaction type, a destination account, a source account, an amount, and a validation status associated with the pending request.

19. The non-transitory computer-readable medium of claim 16, wherein the intervention involves queueing the pending request.

20. The non-transitory computer-readable medium of claim 16, wherein the intervention involves prompting a user to approve the pending request.

21. The non-transitory computer-readable medium of claim 16, wherein the intervention involves running a script configured to avoid a failure of the pending request.

\* \* \* \* \*